Patented Feb. 7, 1950

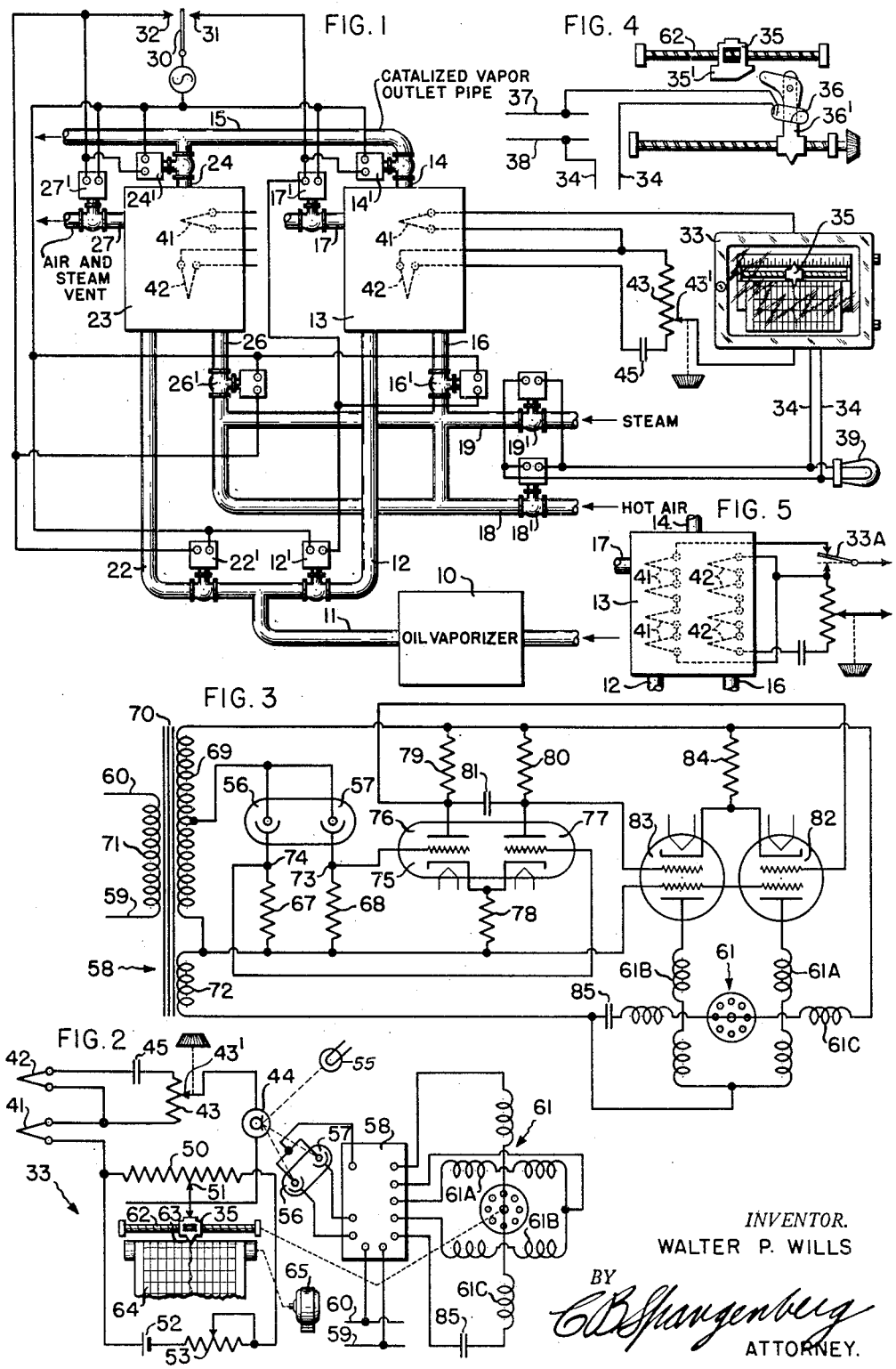

2,497,053

UNITED STATES PATENT OFFICE 2,497,053

MEASURING AND CONTROLLING APPARATUS FOR CATALYST REGENERATORS

Walter P. Wills, Philadelphia, Pa., assignor, by mesne assignments, to Minneapolis-Honeywell Regulator Company, Minneapolis, Minn., a corporation of Delaware Original application April 23, 1942, Serial No. 440,163. Divided and this application July 3, 1943, Serial No. 493,350

5 Claims. (Cl. 23—288)

The general object of the present invention is to provide improved measuring and control apparatus of a type suitable for use in industrial heating processes in which a close regulation of a furnace or work temperature is desirable, and in which a corrective variation in the furnace heat supply made on a change in the controlling temperature, should be suitably related to the rate of change in, as well as to the magnitude of, the the controlling temperature, if objectionable hunting is to be avoided.

A specific object of the present invention is to provide a control system especially adapted for use in controlling the periodical regeneration of catalytic material used in a process in which the control temperature may vary rapidly through a wide range.

Another specific object of the present invention is to combine a multiplicity of thermocouples individually responsive to the temperatures at different points in a heating apparatus so as to form elements responsive to the general or average magnitude of the temperatures at the different points and to the average rate of variation of said temperatures.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described various embodiments of my invention.

Of the drawings:

Fig. 1 diagrammatically illustrates apparatus in which the regeneration of catalytic material is controlled in automatic response to temperature variations and the rates of such variations;

Fig. 2 is a diagramamtic representation of potentiometric measuring and control means included in the apparatus shown in Fig. 1;

Fig. 3 is a detailed diagrammatic representation of an electronic amplifier included in the apparatus shown in Fig. 1;

Fig. 4 illustrates a control switch mechanism included in the measuring mechanism shown in Fig. 2; and Fig. 5 illustrates a modification of the temperature responsive apparatus shown in Fig. 1.

In Fig. 1 I have diagrammatically illustrated the use of the present invention in controlling the regeneration of catalytic material employed in an industrial process in which the periodical regeneration of the catalytic material comprises a heating action tending to increase the temperature of said catalytic material and comprises a cooling action preventing an objectionable increase in the temperature of the catalytic material. In accordance with the present invention, the heating and cooling actions are controlled by means automatically responsive both to the temperature of the catalytic material and to the rate of change of that temperature.

The apparatus shown in Fig. 1 is adapted for use in a known refining process in which petroleum vapors at a temperature of 840° or so, are moved over catalytic material during working periods which alternate with regeneration periods, and during regeneration periods, hot air is moved over the catalytic material to burn away carbon deposited thereon during the working periods, and steam is moved over the catalytic material to prevent the increase in its temperature which the hot air treatment tends to produce.

The apparatus shown diagrammatically in Fig. 1 comprises an oil vaporizing chamber 10 from which oil vapors pass through a pipe 11 and thence through one or the other of two branch pipes 12 and 22 into one or the other of two catalyzing chambers 13 and 23. In accordance with the customary practice, the oil vapors are passed alternately to the two chambers 13 and 23, and the catalytic material in each of those chambers is subjected to regeneration during the periods in which oil vapors are being subjected to the catalytic treatment in the other chamber. The catalyzed oil vapors pass from the chambers 13 and 23 through outlets 14 and 24, respectively, to a delivery pipe 15. During the regeneration periods hot air and steam are passed into the chamber 13 through a pipe 16 and pass away from the chamber 13 through its vent outlet 17. The air then passed into the chamber 13 is supplied by a pipe 18, while the steam passed into the chamber is supplied by a pipe 19. The pipes 18 and 19 also serve during the regeneration of catalytic material in the chamber 23, to supply air and steam to that chamber through its inlet pipe 26 and the chamber 23 then vents through its outlet 27.

As the oil treating and regeneration periods are ordinarily each of a few minutes duration only, the various pipes 12, 14, 16, 17, 22, 24, 26 and 27 are advantageously provided with suitable quick acting solenoid valves 12', 14', 16', 17', 22', 24', 26', and 27', respectively. As shown said valves are adapted for operation in suitably timed relation by the adjustment of a single pole double throw switch 30 between positions in which it respectively engages spaced apart contacts 31 and 32. When the switch 30 is moved into engagement with the contact 31 it opens the valves 12' and 14' and closes the valves 16' and 17', and when moved out of engagement with the contact 31 it effects closures of the valves 12' and 14' and the opening of the valves 16' and 17'. When the switch 30 is moved into engagement with the contact 32 it similarly opens the valves 22' and 24', and it closes the valves 26' and 27' and when moved out of engagement with the contact 32 it opens the two valves last mentioned and closes the valves 22' and 24'.

The same cyclic operations are effected in the chambers 13 and 23. The opening and closure of a solenoid valve 18' in the hot air supply pipe 18 respectively permits and prevents hot air from passing through whichever of the valves 16' and 26' may then be open. Similarly, the opening and closure of a solenoid valve 19' in the steam supply pipe 19 permits or prevents the passage of steam from said pipe through whichever of the valves 16' and 26' is then open. In the regeneration of the chamber 13, the hot air supply valve 18' is open and the steam supply valve 19' is closed during periods in which the temperature in the chamber 13 is suitably low, but on a sufficient increase in the temperature in the chamber 13, a measuring and recording instrument 33, responsive, as hereinafter explained, to the temperature in the chamber 13 and to the rate at which that temperature changes, closes the valve 18' and opens the valve 19', so that the interruption of the hot air supply and the initiation of the supply of steam to the chamber 13 will prevent objectionable overheating of the catalytic material in that chamber.

In the arrangement diagrammatically shown in Fig. 1, the valves 18' and 19' are biased to open and closed positions, respectively, and are moved into their closed and open positions, respectively, only when their solenoid coils are energized. The solenoid coils of the two valves are connected in parallel in an energizing circuit 34, which is closed by the instrument 33 in any suitable manner on a predetermined movement of the instrument pen carriage 35. For example, the instrument pen carriage 35 may include an arm 35', which closes a switch 36 in the circuit 34 shown in Fig. 4, on a predetermined extent of movement of the pen carriage 35 toward the high temperature end of its range of movement. As shown in Fig. 4, the switch 36 is a mercury switch pivoted on a support 36'. The support 36' may be adjusted longitudinally of the pen carriage path of movement to thereby vary the pen carriage position at which the arm 35' engages the switch 36 and tilts it into its closed position. In the latter position, the switch 36 operatively connects the circuit 34 to supply conductors 37 and 38 and thereby energizes the solenoid coils of the valves 18' and 19'. The switch 36 is biased for movement into its open position and opens as soon as the pen carriage 35 moves back toward the left, or low temperature, end of its range of movement. As shown in Fig. 1, a lamp or other signal 39 is connected in parallel with the solenoid windings of the valves 18' and 19' in the energizing circuit 34 so that the signal device will indicate the temperature condition in the chamber undergoing regeneration which causes the hot air supply valve 18' to close and the steam valve 19' to open.

As diagrammatically shown in Fig. 1, the means through which the instrument 33 is made responsive both to the magnitude and to the rate of change of the temperature in the chamber 13, comprises thermocouples 41 and 42 in said chamber. Similar thermocouples 41 and 42 in the chamber 23 are used to make a control instrument responsive to the magnitude and rate of change of temperature in the chamber 23.

The instrument 33 may be connected to the thermocouples 41 and 42 in the chamber 13 during the regeneration of that chamber, and may be connected to thermocouples 41 and 42 in the chamber 23 during the regeneration of the latter or the last mentioned thermocouples may be connected to a separate but similar control instrument through which the energization of the valves 18' and 19' are controlled by the temperature conditions in the chamber 23.

The steam supplied by the pipe 19 may be at a temperature of the same order as the temperature of the hot air supplied by the pipe 18. Even if the steam supplied is at the same temperature as the hot air, the interruption of the hot air supply and the initiation of the steam supply to the chamber, 13 or 23, undergoing regeneration, will prevent further increases in temperature in that chamber and ordinarily will effect a reduction in the temperature in that chamber, since the reaction of the hot air with hot carbon is exothermic, while the reaction of the superheated steam with hot carbon is endothermic. In the regeneration of catalytic material in apparatus of the type diagrammatically shown in Fig. 1, the temperature of the catalytic material may increase in a very few minutes from a normal working temperature of 840° or so, to a maximum safe regeneration temperature in excess of 1100°. Because of the rapid and substantial changes in catalyst temperature and the importance of limiting the rise in the catalyst temperature, control apparatus which takes into account not only the temperature, but also the rate of temperature change in the chamber undergoing regeneration is especially desirable.

The manner in which the thermocouples 41 and 42 in the chamber 13, shown in Figs. 1 and 2 are associated with one another and with the instrument 33, will now be described. The instrument 33 is a self balancing recording and controlling potentiometer instrument. The thermocouple 41 is connected in series with a resistance 43 and a mirror type galvanometer 44 in the measuring circuit of the instrument 33. The thermocouple 42 has one terminal directly connected to one terminal of the resistance 43 and has its second terminal connected through a condenser 45 to the second terminal of the resistance 43. The measuring circuit of the instrument 33 includes a slide wire 50, a contact 51 in engagement with and adjustable longitudinally along the slide wire 50, an energizing battery 52, and a resistance 53 adjustable to insure the desired potential drop in the slide wire. The thermocouple 41 has one terminal connected to one end of the slide wire 50, and has its other terminal connected through the resistance 43 and galvanometer 44 to the movable contact 51.

When the potential of the thermocouple 42 has been constant long enough for its potential and that of the condenser 45 to equalize, the condenser prevents the thermocouple 42 from having any effect on the current flow through the galvanometer 44. However, on a change in the temperature to which the thermocouple 42 is subjected, the corresponding increase or decrease in its potential results in the flow of a condenser charging or condenser discharging current through the resistance 43, and the resultant change in the voltage drop in that resistance has the effect of temporarily adding to or subtracting from the voltage impressed by the thermocouple 41 on the circuit branch including the galvanometer 44.

The thermocouple 42, condenser 45, and the resistance 43 combine to form an element creating a potential difference which is a measure of the rate of change of the temperature of the thermocouple. Furthermore, the last mentioned element is combined with the thermocouple 41 to form a second element creating a potential difference which is the algebraic sum of the E. M. F. created by the thermocouple 41, and the potential difference created by the first mentioned element. The proportion of the potential difference jointly created by the thermocouples 41 and 42 which is contributed by the thermocouple 42 may be varied as desired by the adjustment of contact 43', provided in slideable engagement with the resistance 43 and which permits tapping off a desired part of the potential drop across resistance 43. The potential difference which the two thermocouples 41 and 42 jointly create, is of a character to be measured by potentiometric means operating on the null principle and of which the instrument 33 is one form.

The mirror galvanometer 44 reflects light from a light source 55 onto photoelectric cells 56 and 57, which, as shown are enclosed in a common envelope, and are connected to the input terminals of an electronic amplifier 58. The latter, shown in Fig. 2 and hereinafter described in detail, is energized from alternating current supply conductors 59 and 60, and has its output terminals connected to the terminals of a reversible motor 61.

When the potentiometric measuring circuit is balanced and the galvanometer 44 occupies its neutral or intermediate deflective position, equal amounts of light are reflected onto the cells 56 and 57, and the motor 61 is not energized for rotation in either direction and remains stationary. However, when the measuring circuit is unbalanced the galvanometer deflects out of its neutral position, and one of the cells 56 or 57 receives more light than the other. The motor 61 is then energized for rotation in a direction dependent on which cell receives the more light. The motor 61 is mechanically connected to and rotates the threaded pen carriage shaft 62 of the instrument 33 and thereby adjusts the pen carriage 35 longitudinally of said shaft. The pen carriage 35 carries the contact 51 which is moved by the carriage in the direction to rebalance the potentiometer circuit. The pen carriage also supports a recording pen 63 which traces a record of the pen carriage movement on a record strip or chart 64. The latter is advanced by a constant speed motor 65. When the potentiometer is balanced, the length of the portion of the slide wire 50 at the left of the contact 51 in Fig. 2 is such that the potential drop in said portion, due to the current flow produced by the battery 52 is equal in magnitude and opposite in direction to the potential impressed on said slide wire by the circuit branch including the thermocouple 41 and galvanometer 44.

On a subsequent increase or decrease in the furnace temperature, the potential impressed on the said slide wire portion by the said circuit branch is increased or decreased as a result of the increase or decrease in the voltage of the thermocouple 41, and is further increased or decreased as a result of the change in the voltage of the thermocouple 42 and the resultant change in the potential drop in the resistance 43 due to the flow of the charging or discharging current of the condenser 45. When the potentiometer is thus unbalanced, the motor 61 operates in the the flow of the charging discharging current of direction to move the contact 51 to the right or to the left as required to rebalance the potentiometer.

The increased or decreased voltage of the thermocouple 41, due to the above mentioned change in furnace temperature, is maintained until a further change in the furnace temperature occurs. If following its initial change, the furnace temperature remains constant for a period, the condenser charging or discharging current flow created by an initial change in the voltage of the thermocouple 42 will correspondingly vary the potential of the condenser 45 and die out. As the condenser current thus dies out, the portion of the potential drop in the resistance 43 created by the condenser current will also die out, and thus have the effect of producing a reverse potential rebalancing operation of the motor 61, and a return movement of the contact 51 into the position in which it correctly indicates the existing temperature of the thermocouple 41.

As will be apparent, the potential drop in the resistance 43 in one direction produced by a condenser charging current, or in the opposite direction produced by a condenser discharging current, is in each case proportional to the magnitude of the current and, hence, in each case is directly proportional to the rate of change in furnace temperature, and, as has been made apparent, on a change in the furnace temprature the thermocouple 42 of Fig. 1 operates to temporarily increase the corrective adjustment then produced by the thermocouple 41.

As previously stated, the production of a corrective control effect immediately on a change in a control condition, followed by a delayed control effect opposite in direction to, but smaller in magnitude than the first effect, is conducive to close regulation with little or no hunting tendency, provided the two control effects are suitably proportioned with respect to the controlling condition change giving rise to those effects and to the characteristics of the furnace heating operation or other process in which the control effects are used. The provision of the adjustable contact 43', as shown, facilitates such proportioning of the two control effects.

For optimum results in the use of the invention in the form shown in Fig. 1, the values of the resistance 43 and of the condenser 45 should be suitably related to the operating characteristics of the furnace. The furnace characteristics which thus have to be taken into account depend upon such matters as the heat storage capacity of the furnace walls, the heat absorbing capacity of the work, and the furnace and work temperatures. Merely by way of illustration and example, I note that in one use of apparatus differing essentially from that shown in Fig. 2 only in that the instrument 33 is used to measure and record furnace temperature conditions without subjecting the furnace to corresponding control actions, the resistance 43 has a value of 200 ohms and the condenser 45 has a value of 4,000 mfd.

The electronic amplifier 58 employed in the arrangement shown in Fig. 1 may take various forms, one suitable form being illustrated in Fig. 3. As shown in Fig. 3, the photocells 56 and 57 are connected in a bridge circuit, one branch of which includes the cell 56 and a resistance 67, while the other branch includes the cell 57 and a resistance 68. The bridge circuit receives energizing current from a section of the secondary winding 69 of a transformer 70, which has its primary winding 71 connected to and energized by alternating current supply conductors 59 and 60. The transformer 70 also includes an additional secondary winding 72, the purpose of which is hereinafter explained.

The bridge circuit terminals or junctions 73 and 74 which normally have the same potential, are connected to the input circuit of an electronic valve 75 of the twin type including two triodes in one envelope. Thus, as shown, the bridge terminal 73 is connected to the control grid of the triode 76 and the terminal 74 is connected to the control grid of the triode 77. The cathodes of the two triodes are connected through a common biasing resistance 78 to the terminals of the resistances 67 and 68, respectively, remote from the photoelectric cells 56 and 57. Plate energizing current is supplied to the triodes 76 and 77 by the transformer secondary winding 69. As shown, the plate circuit of the triode 76 includes a resistance 79 connecting the upper end of the winding 69 to the plate of the triode 76, and a connection including the resistance 78 between the cathode of triode 76 and the lower end of the secondary 69. The plate circuit for the triode 77 differs from that for the triode 76 only in that the plate of triode 77 is connected to the upper end of the transformer secondary 69 by a resistance 80. A condenser 81 of suitable value is connected between the ends of the resistances 79 and 80, respectively adjacent the plates of the triodes 76 and 77.

When the photocells 56 and 57 are equally illuminated, the triodes 76 and 77 will be equally conductive and the potential drop across the resistance 79 will be equal to that across the resistance 80. Upon an increase in the illumination of the photocell 56 relative to that of the photocell 57, the triode 77 will be rendered more conductive than the triode 76 and the potential drop across resistance 80 will then exceed that across resistance 79. Conversely, when the illumination of the photocell 57 exceeds that of the photocell 56, the potential drop across resistance 79 will exceed that across resistance 80.

The potential drop across the resistance 79 is impressed on the input circuit of an electronic valve 82, and the potential drop across the resistance 80 is impressed on the input circuit of an electronic valve 83. The valves 82 and 83 are shown as tetrodes, receiving energizing current from the transformer secondary windings 69 and 72 which are connected in series so that their voltages are additive. As shown, the plate circuit of the tetrode 82 includes one winding 61A of the motor 61 through which the anode of the valve 82 is connected to the lower terminal of the secondary winding 72, and a cathode biasing resistance 84 connecting the cathode of the valve 82 to the upper end of the secondary winding 69. The plate circuit of the tube 83 includes the winding 61B of the motor 61 through which the anode of valve 83 is connected to the lower end of the secondary winding 72, and includes the resistance 84 through which the cathode of the valve 83 is connected to the upper end of the winding 69. The screen grids of the tetrodes 82 and 83 are connected to the junction between the secondaries 69 and 72.

A third winding 61C of the motor is also energized from the transformer secondary windings 69 and 72 through a condenser 85 of suitable value. The motor windings 61A, 61B and 61C are so related and disposed that reaction between the magnetic fields produced by the windings 61B and 61C tends to produce rotation of the motor 61 in one direction, while the reaction between the magnetic fields produced by the windings 61A and 61C tends to rotate the motor in the opposite direction. In consequence, the motor 61 rotates in one direction or the other accordingly as the energization of the winding 61A exceeds or is less than that of the winding 61B, and the motor stalls when the windings 61A and 61B are similarly energized.

The plate circuits of the tubes 82 and 83 are connected across the transformer secondary windings 69 and 72 in a direction opposite to that in which the plate circuits of the triodes 76 and 77 are connected across the transformer secondary winding 69. In consequence, control of the conductivity of the tubes 82 and 83 in accordance with the potential drops across the resistance 79 and 80 is permitted because the condenser 81 holds over the potential drops produced across the resistances 79 and 80 in one-half cycle when the triodes 76 and 77 are conductive, to the next half cycle when the tubes 82 and 83 are conductive.

Upon an increase in the potential drop across the resistance 79 relative to that across the resistances 80, the tube 83 will be rendered more conductive than the tube 82, and the energizing current in the motor winding 61B will then exceed that in the motor winding 61A, and the motor 61 will rotate in one direction. Conversely, upon an increase in the potential drop across the resistance 80 relative to that across the resistance 79, the tube 82 will become more conductive than the tube 83, the energization of the motor winding 61A will exceed that of the winding 61B and the motor 61 will rotate in the opposite direction.

The apparatus shown in Figs. 1–4 is well adapted for its intended use, but is subject to modification. In some cases, for example, it may be advantageous to employ in lieu of a single thermocouple 41 in each of the chambers 13 and 23, a plurality of such thermocouples collectively providing an average of the temperatures at a plurality of points in each chamber. Similarly, there may be a plurality of thermocouples 42 in each chamber to collectively respond to the average of the rates of change of the temperatures at a plurality of points in the chamber. In Fig. 5 I have illustrated, more or less diagrammatically, a modification, including such a plurality of thermocouples 41 and 42 in the chamber 13. As shown in Fig. 5 the thermocouples 41 may desirably be connected in series with each other, and similarly, the thermocouples 42 may also be connected in series with each other.

The modification of Fig. 5 also incorporates provisions for selectively connecting either the thermocouples 42 alone to the instrument 33 or for connecting both the thermocouples 41 and 42 to said instrument. These provisions comprise a single pole-double throw switch 33A which in its dotted line position connects only the thermocouples 42 to the instrument 33, and which in its full line position connects both the thermocouples 41 and 42 to the instrument 33. When the switch 33A is in its dotted line position, the instrument 33 provides a record of, and operates to effect a control action in response to the rate of change of the temperatures at a plurality of points in the chamber 13 independently of the actual magnitudes of those temperatures. When the apparatus is so employed, the instrument 33 is preferably of the form adapted to assume a center or intermediate position when the applied voltage under measurement is zero. With the switch 33A in its full line position the instrument 33 provides a record of and operates to effect a control action in joint response to the rate of change of temperature at a plurality of points in the chamber 13 and the average magnitude of the temperature at a plurality of points within the chamber 13. It will be understood that the plurality of points in the chamber 13 to the temperature of which the thermocouples 41 respond, may be the same as, or if desired may be as shown, different from the points to changes in the temperature of which the thermocouples 42 respond. The present application is a division of my prior application Serial No. 440,163, filed April 23, 1942, now Patent No. 2,413,128.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A system for controlling the regeneration of catalytic material having carbon deposited thereon comprising a chamber for the catalytic material having a first valved inlet conduit for the introduction of a regeneration gas, a second valved inlet conduit for the introduction of an inert gas, a thermocouple arranged within said chamber to respond to changes in temperature of said catalytic material, a condenser having one terminal connected to one terminal of said thermocouple, a resistor connecting the second terminal of the condenser to the second terminal of the thermocouple, a second thermocouple arranged within said chamber to respond to changes in temperature of said catalytic material and having one terminal connected to said second terminal of the first mentioned thermocouple, means responsive to the voltage difference between the second terminal of the second thermocouple and the second terminal of said condenser, said last named means being constructed and arranged to operate the valves of the first and second conduits.

2. A system for controlling the regeneration of catalytic material having carbon deposited thereon comprising a chamber for the catalytic material having a first valved inlet conduit for the introduction of a regeneration gas, a second valved inlet conduit for the introduction of an inert gas, a thermocouple arranged within said chamber to respond to changes in temperature of said catalytic material, a condenser having one terminal connected to one terminal of said thermocouple, a resistor connecting the second terminal of the condenser to the second terminal of the thermocouple, means responsive to an increase of predetermined magnitude in the voltage difference between said second terminals, said last named means being constructed and arranged to operate the valves of the first and second conduits.

3. A system for controlling regeneration of catalytic material having carbon deposited thereon, comprising a chamber for the catalytic material having a first inlet conduit for the introduction of hot air and regulating means adjustable to permit and to prevent flow of hot air into the chamber through said first conduit, a second inlet conduit for the introduction of steam and regulating means adjustable to permit and to prevent the flow of steam into said chamber through said second conduit, a thermocouple arranged within said chamber to respond to changes in the temperature of said catalytic material, a condenser having one terminal connected to one terminal of said thermocouple, a resistor connecting the second terminal of the condenser to the second terminal of the thermocouple, thermometric means arranged within said chamber to respond to changes in said temperature and to create a control force varying with said temperature, and means connected to said second terminals so as to be responsive to the voltage difference between said second terminals and so constructed and arranged with respect to said thermometric means as to be responsive also to said force, said last mentioned means being constructed and arranged to operate said adjustable means associated with said first and second conduits.

4. A system for controlling regeneration of catalytic material having carbon deposited thereon, comprising a chamber for the catalytic material having a first inlet conduit for the introduction of hot air and regulating means adjustable to permit and to prevent flow of hot air into the chamber through said first conduit, a second inlet conduit for the introduction of steam and regulating means adjustable to permit and to prevent the flow of steam into said chamber through said second conduit, a thermocouple arranged within said chamber to respond to changes in the temperature of said catalytic material, a condenser having one terminal connected to one terminal of said thermocouple, a resistor connecting the second terminal of the condenser to the second terminal of the thermocouple, thermometric means arranged within said chamber to respond to changes in said temperature and to create a voltage difference varying with the last mentioned temperature, and means connected to said thermometric means and to said second terminals so as to be responsive to the resultant of said voltage difference and the voltage difference between said second terminals, said last mentioned means being constructed and arranged to operate said adjustable means associated with said first and second conduits.

5. A system for controlling regeneration of catalytic material having carbon deposited thereon, comprising a chamber for the catalytic material having a first inlet conduit for the introduction of hot air and regulating means adjustable to permit and to prevent flow of hot air into the chamber through said first conduit, a second inlet conduit for the introduction of steam and regulating means adjustable to permit and to prevent the flow of steam into said chamber through said second conduit, a thermocouple arranged within said chamber to respond to changes in the temperature of said catalytic material, a condenser having one terminal connected to one terminal of said thermocouple, a resistor connecting the second terminal of the condenser to the second terminal of the thermocouple, electrical means arranged within said chamber to respond to changes in said temperature and to create a voltage difference varying with said temperature, and means connected to said electrical means and to said second terminals so as to be responsive to the resultant of said voltage difference and the voltage difference between said second terminals, said last mentioned means being constructed and arranged to operate said adjustable means associated with said first and second conduits.

WALTER P. WILLS.

REFERENCES CITED

The following references are of record in the file of this patent:

UNITED STATES PATENTS

| Number | Name | Date |
|---|---|---|
| 2,073,650 | Prickett | Mar. 16, 1937 |
| 2,282,726 | Jones | May 12, 1942 |
| 2,316,240 | Harrision | Apr. 13, 1943 |
| 2,330,767 | Welty, Jr. | Sept. 28, 1943 |